P. ANDREOLETTI 3,080,959

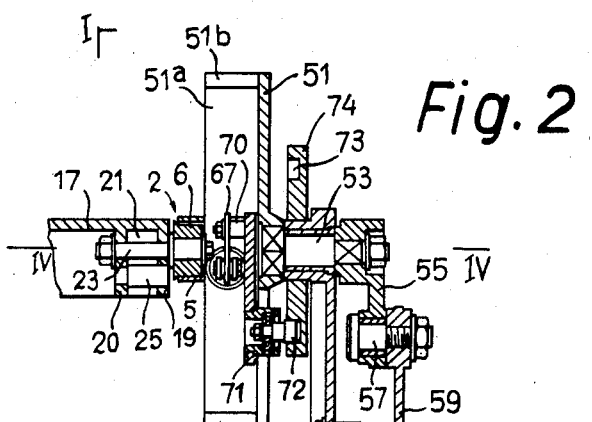
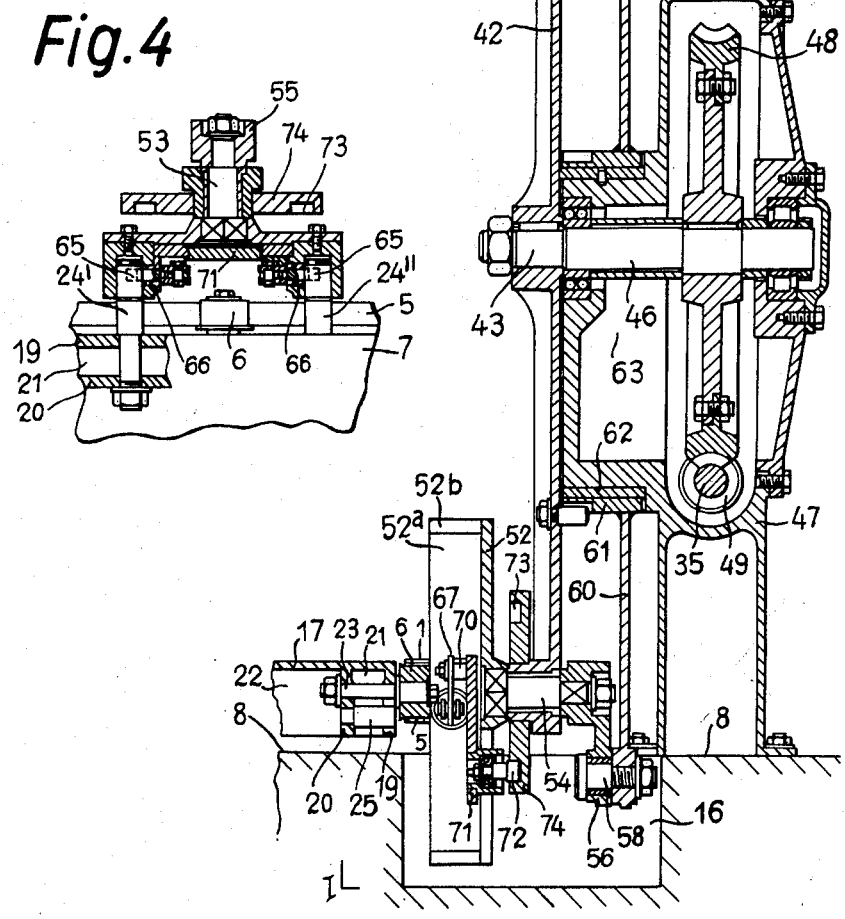

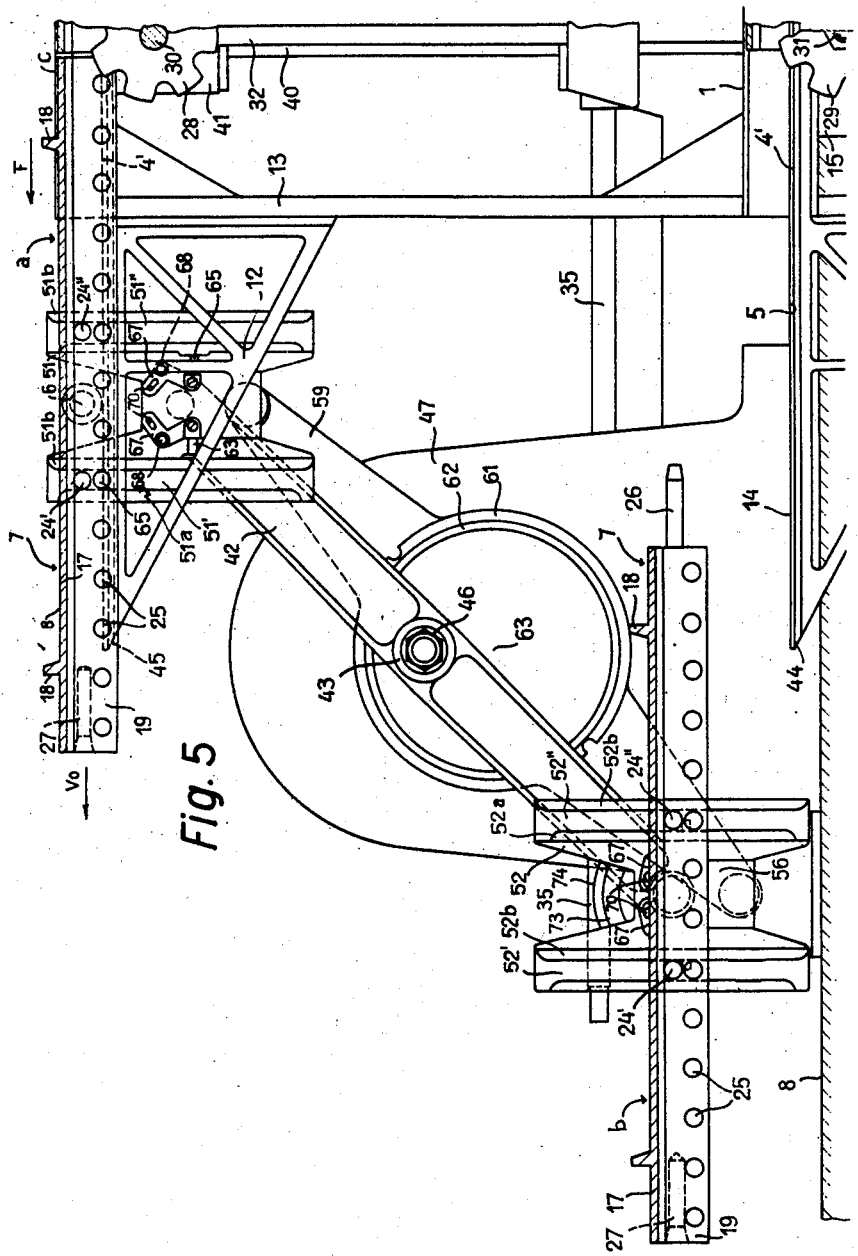

TRUCK CONVEYOR FOR TRANSPORTING BULKY
ARTICLES, ESPECIALLY MOTOR VEHICLES

Filed Nov. 14, 1958

*Inventor*
Patrizio Andreoletti

By Robert E. Burns

*Attorney*

United States Patent Office 3,080,959
Patented Mar. 12, 1963

3,080,959
TRUCK CONVEYOR FOR TRANSPORTING BULKY ARTICLES, ESPECIALLY MOTOR VEHICLES
Patrizio Andreoletti, Bergamo, Italy, assignor to AU.RO S.r.l., Bergamo, Italy, a corporation of Italy
Filed Nov. 14, 1958, Ser. No. 773,933
Claims priority, application Italy Nov. 14, 1957
6 Claims. (Cl. 198—108)

The present invention refers to a carriage conveyor of the kind which comprises two pairs of straight rails, namely one lower and one upper pair respectively horizontal, superimposed and spaced in a vertical direction and on which a carriage rests by means of a single pair of wheels the axes of which are placed in the horizontal middle plane of the carriage, the carriage being movable along the rails by engagement of one carriage with the next due to the action of propelling means placed near the opposite ends of each pair of rails, and which includes near the extreme ends of the said rails, means for the rapid transfer of the carriage from the upper rails to the lower rails and vice versa, means for maintaining the load-supporting plane of a carriage horizontal during the transfer thereof, and means to disengage an end carriage of each row moving along the upper and lower pairs of rails, to transfer the carriage disengaged from one row to the other row at a speed greater than that of the linear speed by which the carriages are moved along a pair of rails, and to retard the speed of the carriages as they are moved on to the other pair of rails. Such a conveyor will be referred to in the appended claims as "a conveyor of the kind described."

Known conveyors of the kind described have various disadvantages in that they make use of curved rails connected to the upper and lower pairs of rails respectively and also, for the purpose of increasing and decreasing the speed of the carriages, they have special means which are different from those which cause the transfer of the carriages from the upper to the lower rails. This causes not only an increase in the cost of the plant and of its operation but also considerable constructional difficulties which influence adversely the efficiency of the plant and the safety of its operation.

A main object of the present invention is to avoid these difficulties by providing a conveyor of the kind described which has a simplified structure, in which the use of semi-circular curved rails is eliminated, and which brings about a reduction in the cost of the plant and of its operation and ensures that the conveyor will work with a good margin of safety.

According to the present invention there is provided a conveyor of the kind described wherein the means for increasing and decreasing the speed of the carriages near the opposite ends of the upper and lower straight rails respectively are combined with the means for the transfer of the carriages from the upper rails to the lower rails and vice versa, at a speed greater than that of the linear speed at which the carriages are moved along the rails.

In order that the invention may be clearly understood some embodiments thereof will now be described, by way of example, with reference to the accompanying drawings, in which:

FIG. 2 is a section along the line II—II of FIG. 1;

FIG. 4 is a partial section along the line IV—IV of FIG. 2;

FIGS. 5 and 6 are sections similar to that of FIG. 1 but show the parts in different operational positions thereof.

Figure 1:
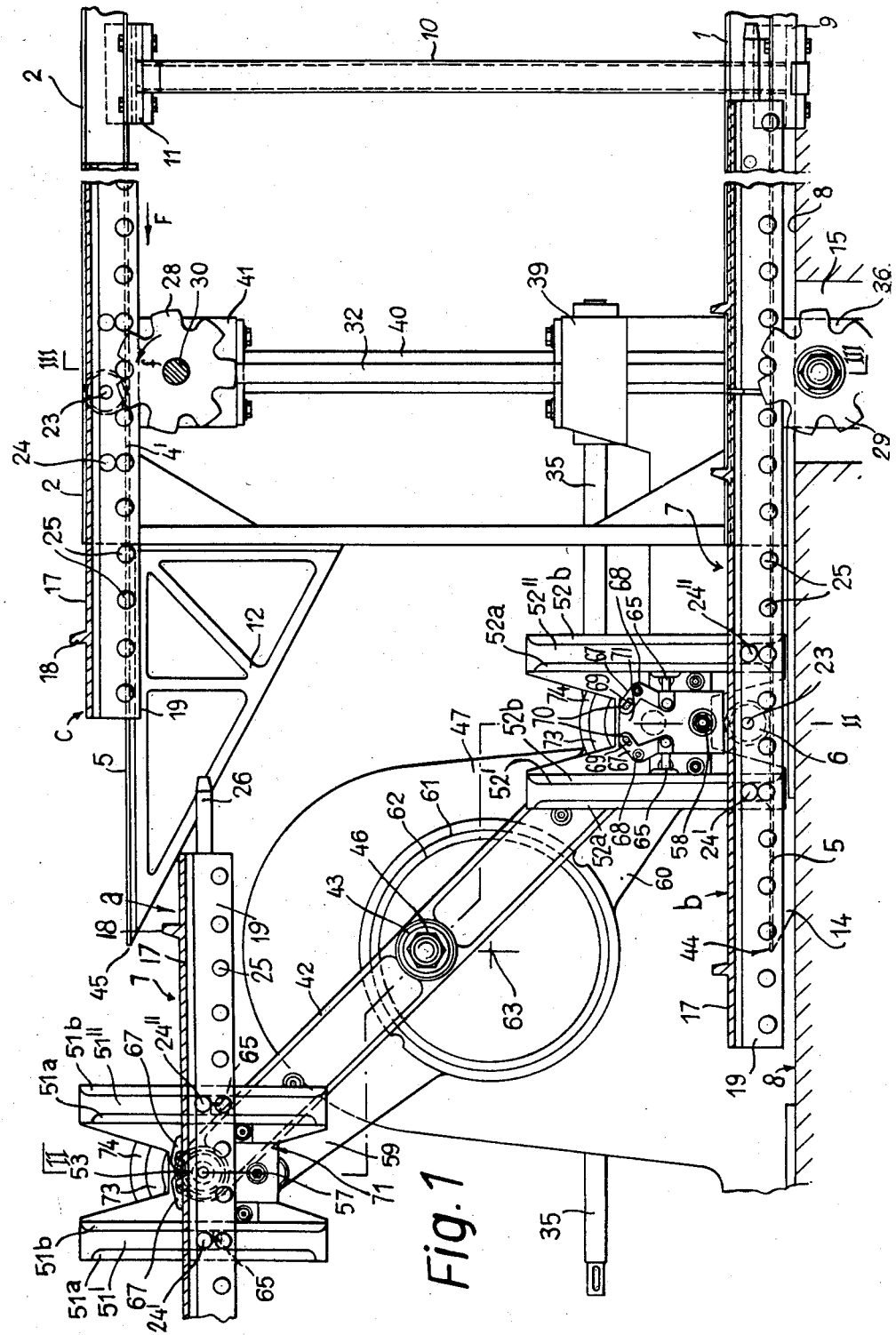
FIG. 1 is a sectional elevation of one of the ends of a conveyor according to the invention, along the line I—I of FIG. 2.

Referring to the drawings, the conveyor comprises two pairs of straight rails placed horizontally namely one pair of lower rails generally indicated by 1 and a pair of upper rails generally indicated by 2. Each pair of rails 1 and 2 consists essentially of two identical channel shaped sections 4, FIG. 3, having their hollow parts directed towards the vertical middle plane of the conveyor and the rails are provided, near their opposite ends, with extensions 5, FIG. 1, of their lower sides 4'. The opposite edges of the said extensions 5 are in a line, for each pair of rails, with the inside edges of the lower sides of the corresponding channel sections. However, for reasons which will appear clear from the following description, the width of the extensions 5 is smaller than that of the lower sides 4' of the channel sections.

The corresponding rails of the pairs 1 and 2 are superimposed one over the other and the lower sides 4' of the channel sections, together with their respective extensions, act as rolling surfaces for the wheels 6 of the carriages 7 of the conveyor, when the carriages are in correspondence with the upper or lower section respectively of the path over which they must travel when the conveyor is working.

The channel shaped sections 4 belonging to the pair of lower rails 1 are suitably fixed through supporting elements 9, FIG. 1, to the floor 8 of the premises in which the conveyor is placed. Each of the supporting elements 9 is connected to a pillar 10 on top of which there is a support 11 for the channel section which constitutes one of the rails belonging to the pair of upper rails 2.

The extensions 5 of the lower sides of the sections 4 constituting the upper rails 2 are supported, near each opposite end of the conveyor, by lattice brackets 12, fixed to the pillars 13 supporting the ends of the respective channel rails.

The extensions 5 of the channel sections constituting the lower rails 1 are also supported by identical brackets 14 or by identical organs, because owing to special constructional reasons, the surface of the floor 8 is lower near the ends of the lower rails 1 and there are side longitudinal cavities 15, FIGS. 1 and 3, and 16, FIG. 2.

The height of the pillars 10 and 13 is suitably determined in accordance with the floor space required by the presumed load of the carriages 7 and the pillars supporting the opposite rails may be interconnected, near their upper end, by means of cross members for the purpose of strengthening the whole structure.

Each carriage 7 has an upper loading platform 17, FIGS. 1 and 2, strengthened, if necessary, with two cross ribs 18 near its upper surface, and resting on a frame incorporated with it and placed underneath. This frame comprises a pair of side walls 19, projecting in a vertical downward direction, as viewed in FIG. 2, from the side edges of the loading platform 17, and two internal side walls 20, parallel to the walls 19 but displaced towards the middle plane of the carriage, so as to form, with them and the platform, channels 21 extending on both sides of and lengthwise of the carriage.

The ends of the inner side walls 20 are interconnected by transverse walls 22, FIG. 2, jutting out in a vertical downward direction from the opposite transverse edges of the carriage platform 17.

Each carriage has a pair of wheels 6, FIG. 2, adjacent to the walls 19 and mounted so as to rotate about pivots 23 supported by the side walls 19 and 20 of the frame. The pivots 23 project laterally from the walls 19 of the carriage or truck, are coaxial, and have their common axis located in the vertical, transverse middle plane of the carriage.

Two pins or pivots 24' and 24" equi-distant from opposite sides of the pivots 23 have their axes lying in a plane parallel to the upper plane of platform 17 and the axes of the pivots 23 also lie in this plane. The pins 24′ and 24″ are supported, as in the case of pins 23, by the walls 19 and 20 of the frame of the carriage and project laterally from the walls 19 for a greater distance than the axial length of the wheels 6 and the respective pivots 23. However, their length is chosen so that their ends are clear of the ribs of the channel sections when the wheels 6 of the trucks rest on the lower sides 4′ of those sections. In this way, there is no danger that the pins 24′ and 24″ will interfere with any objects placed near the rails or that they will harm people who may be present for control purposes or for servicing the plant.

The pins 24′ and 24″, however, project laterally beyond the longitudinal edges of the extensions 5 when the wheels of the carriages rest on the extensions 5 because the width of the extensions 5 is substantially the same as that of the rims of the wheels 6 of the trucks.

Naturally, if it is desired to simplify structure, the plain rails can be used.

Below pins 23, 24′ and 24″ and with their own ends fixed to the walls 19 and 20 of the carriage frame, are pins 25, FIG. 1. The pins 25 are placed in longitudinal rows on both sides of the carriage so that the pins of a row placed on one side are coaxial with the pins of the corresponding row on the other side. The axes of the pins 25 lay in a plane parallel to the plane containing the axes of the pins 23, 24′ and 24″ and the pins 25 are spaced apart at equal intervals to form a roller chain.

Each transverse wall 22 of each carriage has one or more projections 26 and cavities 27, the projections 26 of one carriage being adapted to engage, as appropriate, in the cavities of the next preceding or of the next succeeding carriage. This takes place when the carriages travel on the rails 1 and 2 or when they stop near them.

Near the opposite end of each of the pair of channel shaped rails there are two co-axial sprockets 28 for the upper rails and 29 for the lower rails respectively. The sprockets 28 and 29 are placed inside and below the channels 4, so that the upper part of their peripheries enter the side channels 21 of the carriages and their teeth can be engaged with the pins 25 to effect a pushing action of the carriages, this movement being directed towards one end or the other end of the conveyor.

The sprockets 28 are keyed on a common shaft 30 placed below the rails 1 and extending crosswise relatively to them. The shaft 30 is driven at its opposite ends through bevel gears 31 and vertical shafts 32. Each of the shafts 32 has a worm wheel 33, FIG. 3, keyed on it, and the wheel 33 engages a helical screw 34 formed on a horizontal shaft 35.

Figure 3:
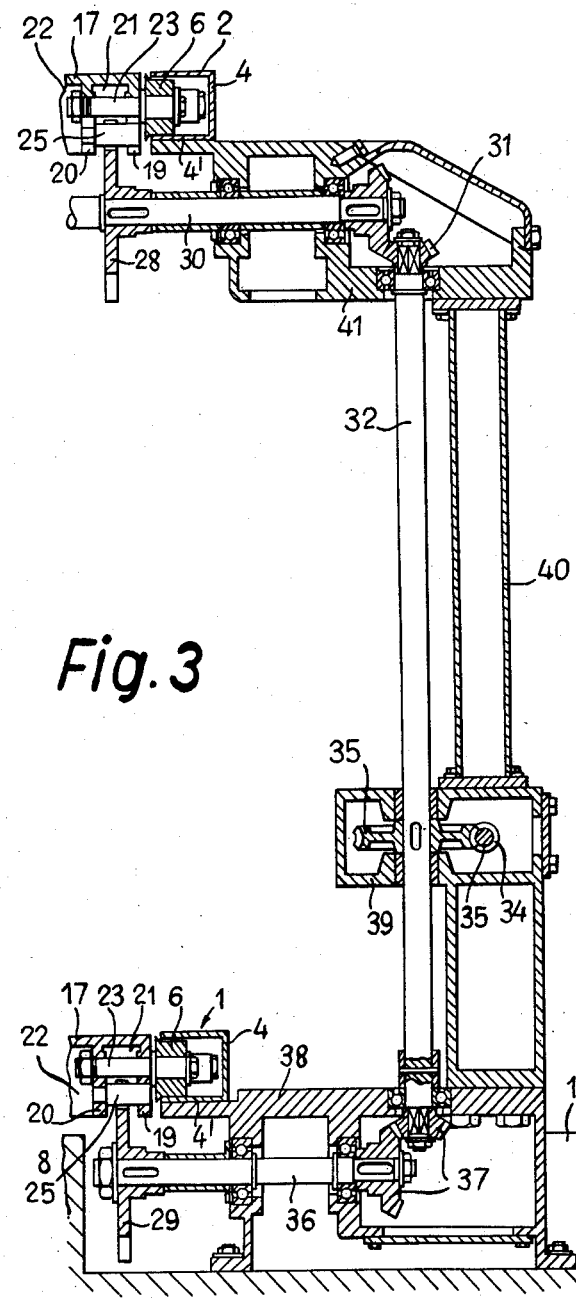
FIG. 3 is a section along the line III—III of FIG. 1.

Each of the sprockets 29 is keyed on a separate shaft 36 driven through bevel gears 37, FIG. 3, by a vertical shaft 32. The arrangement above described ensures that the pair of sprockets 28 and 29 rotate at the same time and in opposite directions according to the operational requirements of the conveyor.

Each set, comprising a sprocket 29, the shaft 36 supporting it and the bevel gears 37, is supported by a bedplate 38, FIG. 3, which also supports a channel section 4 and a box 39 containing the worm wheel 33 and helical screw 34.

Each bedplate 38 is set in one of the cavities 15 of the floor and each of the boxes 39 supports a pillar 40 at the top of which there is a support 41 housing one of the pairs of bevel gears 31 and the bearings for one of the ends of the shaft 30. The support 41 also carries one of the channel shaped sections 4 belonging to the pair of upper rails 2.

When the sprockets 28 rotate in an anti-clockwise direction (namely in the direction of the arrow F shown in FIG. 1), the sprockets 29 will rotate in the opposite direction and the carriages, the wheels 6 of which rest on the upper rails 2, will travel in the direction of the arrow F, whilst the carriages having wheels resting on the lower rails 1 will travel in the opposite direction. The pairs of sprockets 28 and 29 placed at the top on the right (not shown in the illustration) and at the bottom on the left respectively will push the last carriage of the row (numbering taking place in the direction of the travel of the carriages) and this push will cause all preceding carriages which are near to one another to move along the upper and the lower rails respectively. At the same time, the pairs of sprockets 28 and 29 placed at the top on the left and at the bottom on the right respecively (not illustrated) will act on the first of the row of carriages travelling along the upper and the lower rails respectively towards the corresponding ends of the said rails where these carriages will be picked up by special devices, to be described below, and transported to the other side of the conveyor namely to the lower or the upper rails as the case might be.

By inverting the direction of rotation of the sprockets 28 and 29, the pairs of sprockets 28 placed at the top on the left and of the sprockets 29 placed at the bottom on the right (not illustrated) will cause the row of carriages to travel on the upper and the lower rails respectively and the pair of sprockets 28 placed at the top on the right (not illustrated) and of the sprockets 29 placed at the bottom on the left will act on the first carriages of their respective rows towards the right hand end of the upper rails and the lefthand end of the lower rails, namely towards the part in which the carriages are shifted from one pair of rails to the other.

The devices for moving the carriages from the upper to the lower section of the conveyor and vice-versa consist of two pairs of rotating arms 42, FIG. 1, one pair for each end of the conveyor. The arms of each pair rotate round a common axis 43, transverse to the direction of movement of carriages along the rails 1 and 2 and lying in the vertical plane which contains the ends 44 and 45 of said rails. The arms 42 of a pair are spaced apart on opposite sides of the extensions 5.

Each of the arms 42 is supported by a shaft 46 rotatable in a bearing 47, fixed at the side of one of the cavities 16, FIG. 2, in the floor 8, said shaft 46 carrying a worm wheel 48 which engages a helical screw 49 fast with the shaft 35 which also drives the sprockets 28 and 29 placed on the same side of the conveyor.

Accordingly, the arms 42 rotate in synchronism one with another and have always the same angular positions relatively to the fixed frame of the conveyor. This is achieved by driving the shafts 35 by a single motor or by several synchronised motors.

Each of the rotating arms 42 carries at its opposite ends the supporting members 51 and 52, FIG. 2, respectively which will select and support the carriages 7 during their travel from the upper rails 2 of the conveyor to the lower rails 1 and vice versa.

The supporting members 51 and 52 are mounted so as to rotate on pivots 53 and 54, FIG. 2, respectively carried by each of the rotating arms 42. The axes of the pivots 53, 54 are equidistant from the axis 43 about which the pairs of arms 42 rotate, and the distance between the axes of the pivots 53, 54 is equal to the distance between the horizontal planes in which the axes of the wheels 6 of the carriages are moved when the carriages travel on the upper rails 2 or on the lower rails 1 of the conveyor respectively.

Whilst the arms 42 are rotating, the axes of the pivots 53 and 54 respectively travel in circular paths, to which the said horizontal planes containing the axes of the wheels 6 of the trucks are substantially tangential.

The supporting members 51 and 52 are identical each of them comprising a pair of guides 51′ and 51″ and 52′ and 52″, FIG. 2, respectively, outlined laterally by two ribs 51a and 51b and 52a and 52b respectively. The guides 51′ and 51″ and 52′, 52″ are, for each of the supporting members 51 and 52, disposed to be equi-distant from opposite sides of the axes of the pivots 53 and 54 respectively, the spacing between the guides of each pair being such that the pairs of guides can receive the pins 24' and 24" respectively, which project laterally from the side walls 19 of the frames of the carriage.

For the purpose of keeping the guides 51', 51", 52', 52" always in a vertical position during the rotation of the arms 42, the end of the pivots 53 and 54, opposite to those borne by the supporting member 51 and 52 respectively, are connected respectively to levers 55 and 56, FIG. 2.

The levers 55 and 56 are joined by pins 57 and 58 respectively to arms 59 and 60 which have the same length but are diametrically opposed to one another. The arms 59 and 60 are secured to a bushing 61 mounted so as to rotate on a ring 62 inserted on the part of the bearing 47 which supports the shaft 46 of the arm 42. The axis of each of the rings 62 is eccentric to the axis 43 of the pivots 46 and the extent of eccentricity and the length of the arms 59, 60 and of the levers 55 and 56 are so chosen that during rotation of the arms 42 the corresponding supporting members 51 and 52 always keep such a position that their guides 51', 51"; and 52', 52" are respectively vertical.

Figure 7:
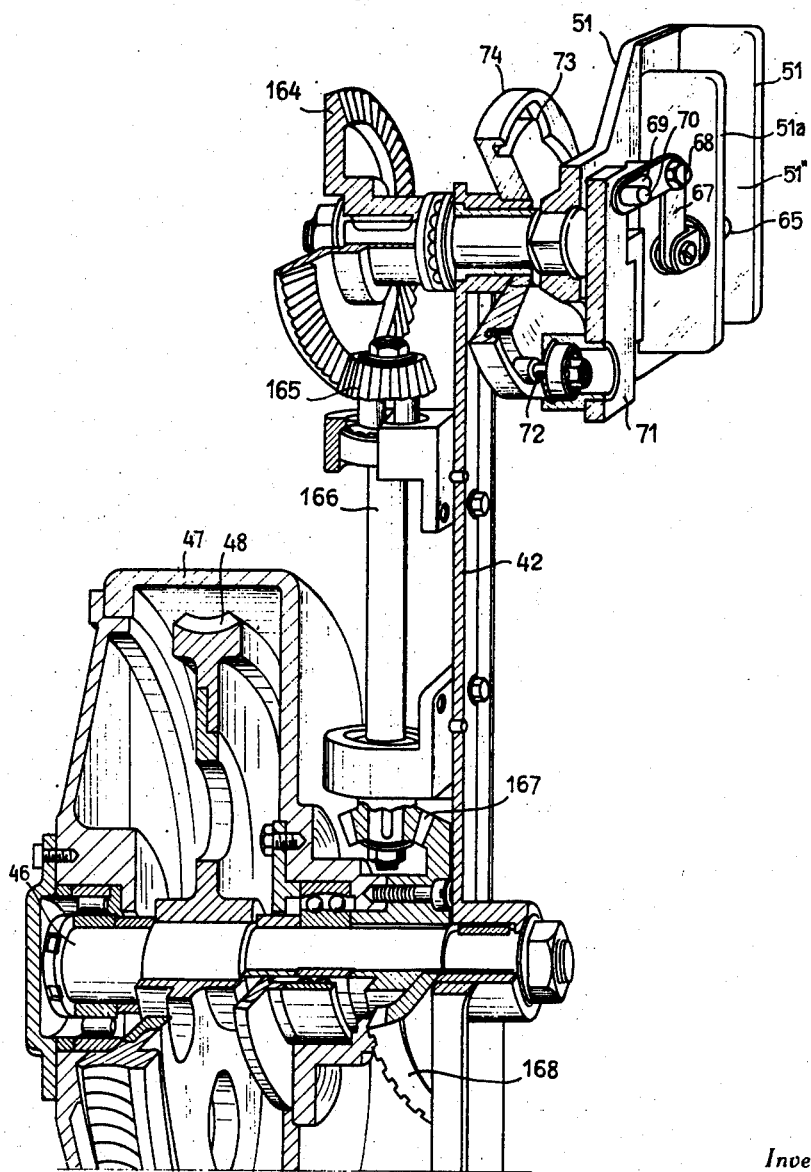
FIG. 7 is a perspective view drawn on a larger scale, of a constructional detail of the conveyor.

According to an alternative construction illustrated in FIG. 7, the same object can be achieved by fixing to each supporting member 51 and 52 a bevel gear 164 meshing with another bevel gear 165 keyed on a shaft 166 supported by arm 42 and having, at the other end, a bevel gear 167 meshing with a bevel gear 168 fixed to a part of the bearing.

Each supporting member 51 or 52 is also provided with a pair of pins 65 sliding in a direction transverse to the length of grooves 66, FIG. 4, formed in the guides 51b and 51a and 52a and 52b respectively, nearest to the pivots 53 and 54. The ends of the pins 65 nearest to the pivots 53 and 54 respectively are each articulated to a square lever or bellcrank 67, FIGS. 1, 2 and 7, held by a supporting member so as to be capable of swinging at 68. The other end of each of the levers 67 has an eyelet 69 engaging a pin 70 fastened to a slider 71 parallel to the guides 51', 51" an 52', 52" of the supporting members 51 and 52 respectively. Each slider 71 carries, on the side opposite to the said guide, a rotating pin 72 the free end of which is located in a cam track 73 formed in a disc 74 fastened to the corresponding arm 42. The slotted cam 73 is shaped so as to move the slider upwards or downwards according to pre-determined positions of the arms 42 and so as to cause the introduction or the withdrawal respectively of pins 65 into, or from, guides 51', 51", 52', 52".

The working of the conveyor will now be explained in detail with special reference to FIGS. 1, 5 and 6 which show three consecutive operational stages.

The speed of rotation of the arms 42 bearing the supporting members 51 and 52 is such that guides 51' and 51" or 52' and 52" respectively engage pins 24' and 24" when the speed of travel in a horizontal direction of each of the supporting members 51 and 52 is equal to the linear speed of travel of the carriages along the horizontal rails 1 and 2 of the conveyor.

FIG. 5 shows the position occupied by the parts of the conveyor when the pins 24' and 24" (seen in the direction of travel as indicated by the arrow F) of the first carriage a of the row of carriages supported by the upper rails 2 come into engagement with the guides 51' and 51" respectively of the supporting members 51.

The same illustration shows that the supporting members 52, mounted at the opposite end of the arm 42, support another carriage b which is reaching the end of the stage of its transfer from the upper rails 2 to the lower rails 1. The carriage b is supported by the supporting members 52, the pins 24' and 24" being supported by the cross pins 65 projecting within the guides 52' and 52" of the supporting members 52 adjacent to the opposite side walls 19 of the carriage b.

The supporting members 51 and 52 comprise pairs of guides 51' and 51" and 52' and 52" respectively. The guides are U-shaped in cross-section and have legs 51a and 51b and 52a and 52b respectively. Referring to FIG. 5 the legs 51a and 52a are shorter than the legs 51b and 52b, thereby allowing the pins 24' and 24" to pass over the shorter legs to engage the longer legs as the guides are rotated. The horizontal components of the rotation of the guides is imparted through the legs to the pins 24' and 24" and to the carriage which is continued in horizontal motion along the rails because the vertical components of the guide's rotation slidingly displaces the pins 24' and 24" in the vertical guides.

When the arm 42 is vertical and the supporting wheels 6 are about to leave the extremity of the rails, the pins 65 are engaged through the legs of guides 51' and 51" respectively, and support the pins 24' and 24", preventing them from sliding downward with respect to the guides. The pins 65 remain engaged in the guides during further rotation of the supporting member 51 to its lowermost point corresponding to the position of supporting member 52 in FIG. 6. At this point when the wheels 6 are resting on the lower rails, the pins 65 are retracted into their seats 66 by cam drive 73 engaged with the roller 72 and driving the linkage mechanism 71, 70, 69, 68 and 67 as illustrated in FIG. 7. The pins 24' and 24" are then free to slide within the guides until carried clear of the guides by the horizontal component of rotation of the supporting member.

FIG. 5 shows that at the moment when the guides 51' and 51" of the supporting members 51 engage with the pins 24' and 24" of the carriage a, the teeth of the upper sprocket 28 disengage themselves from the last of the pins 25 of the carriage a (considered in the direction of the travel of the carriage). From that moment, the carriage a, initially engaging the supporting members 51, will acquire an increased linear speed owing to the increased horizontal component of the speed of rotation of the arms 42 as one of them nears top dead center, the ribs 51b engaging and coacting with the pins 24' and 24" of the carriage.

Figure 6:
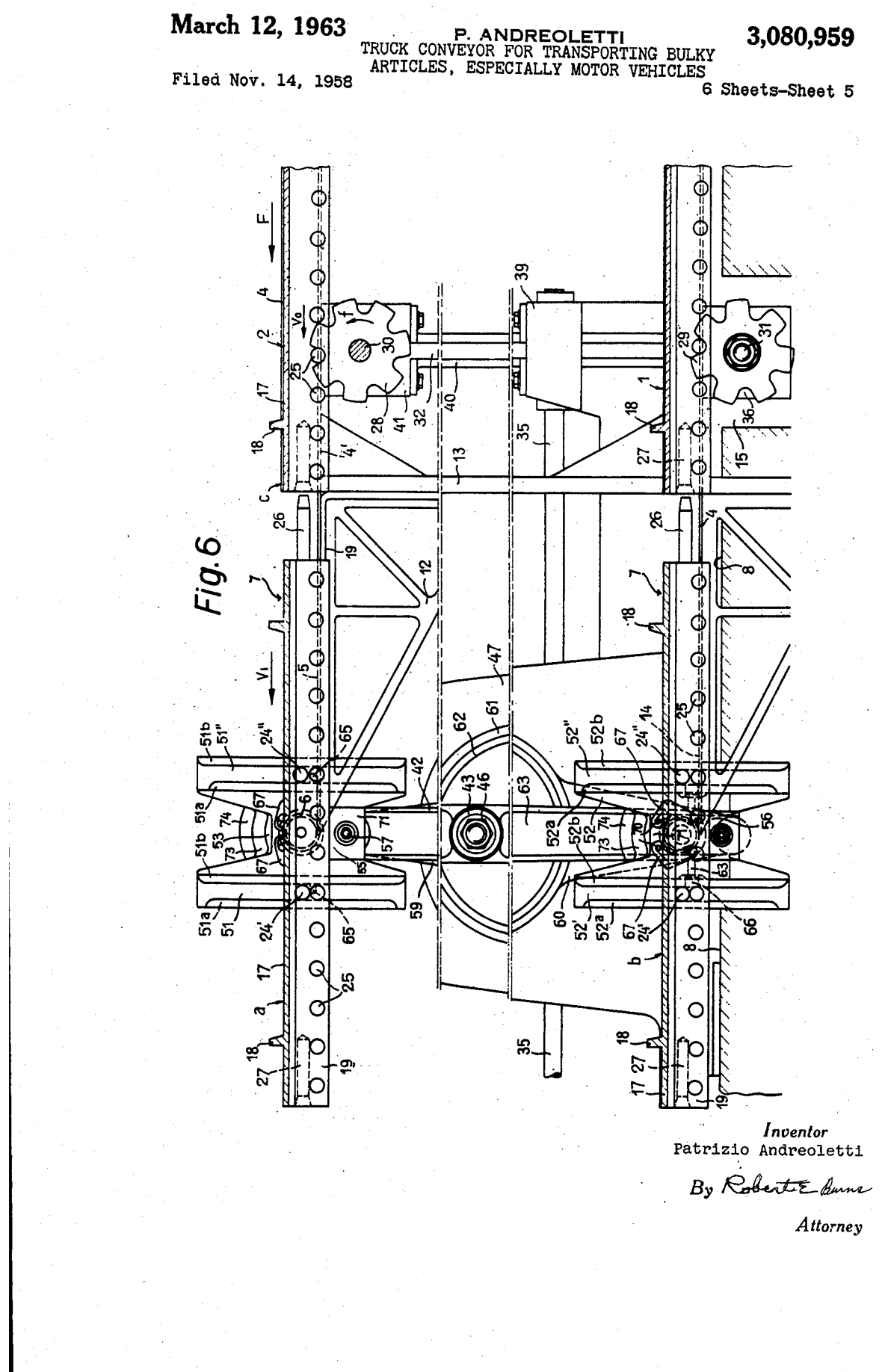

Looking now at FIG. 6, which shows the subsequent operational stage of the conveyor, it will be seen that the arms 42 are in a vertical position and that the carriage a has reached a speed $(V_1)$ equal to the peripheral speed of the axes of the pins 53 and 54, owing to the rotation of the arms 42, which speed is higher than the linear speed $(V_0)$ of travel of the carriages along the horizontal rails 1 and 2.

This increase in the speed of the carriage a is due to the rotation of the arms 42 during their passage from the position shown in FIG. 5, which they had when the supporting members 51 first came into engagement with the first carriage a moving on the upper rails 2, to the position, shown in FIG. 6, which they have when the mutual position between the supporting members 51 and the first carriage a above mentioned reaches the position thereof in which it will be transferred from one section of the conveyor to the other. During rotation of the arms 42 there is also a displacement of the guides 51' and 51" and of the pins 24' and 24" in a vertical direction.

Referring to FIGS. 4 and 7 at the moment when the arms 42 are in a vertical position, the pins 65 of the supporting members 51 are pushed out of their seats 66 and transverse the guides 51' and 52" through the operation of the cams 73 on the pins 72 of the sliders 71, and of the latter on the square levers or bellcrank 67. Consequently, during a further rotation of the arms 42, the pins 65 will support the pins 24' and 24" projecting from the opposite sides of the carriage a and normal to the pins 65.

The increase in the linear speed undergone in the meantime by the carriage a causes that carriage to be separated from the subsequent carriage c and the projections 26 of carriage a to be withdrawn from the cavities 27 of the carriage c, so that the carriage a is independent of the row of carriages connected one to another and moving on the upper rails of the conveyor.

At the same time, the carriage b, supported by the supporting members 52, has reached a position where its wheels 6 rest on the lower rails 1 of the conveyor and the carriage has a linear speed, equal to the peripheral speed of travel of the axis of pin 54, and greater than that of the linear speed ($V_0$) of the carriage on rails 1.

When the arms 42 rotate further up to the position shown in FIG. 1, the carriage a, supported by the supporting members 51 in the position shown in the said figure, moves at a linear speed which decreases and with an angular speed which increases. At the same time, the carriage b, previously supported by the supporting members 52 and having its wheels 6 resting on the rails 1, has moved in the direction of the row of carriages traveling at linear speed ($V_0$) on the lower rails 1 with a decreasing speed and has practically reached a speed equal to that of the row of carriages. That carriage now has nearly reached the last carriage of the row and its projections 26 are inserted into the cavities 27 of the preceding carriage and those of its pins 25 placed near its end (shown on the right, in the drawing) are ready to engage the teeth of the sprocket 29, so that the carriage can receive a further push from the sprocket 29 and transmit it to the row of carriages preceding it on the rails 1. At the same time, the pins 24' and 24" of this carriage are released from the guides 52' and 52".

By comparing FIGS. 6 and 1 it is possible to see that the guides 52' and 52" have moved in a vertical direction relatively to the pins 24' and 24" of the carriage b. This has been possible because the pins 65 supporting the pins 24' and 24" of carriage b have been withdrawn through the action of the cams 73 on the respective leverage, just when the wheels 6 of carriage b touch the rails 1.

During the further rotation of the arms 42, the supporting members 52 engage the carriage c, whilst carriage a, carried by the supporting members 51, takes the position which carriage b had in FIG. 1 and so the cycle recommences.

What I claim is:

1. Improved apparatus for the conveyance of objects from one level to another and in opposite directions on the respective levels, said objects maintaining their orientation in transit, said apparatus comprising in combination: two pairs of parallel rails, a pair of rails on each level with the rails of one level lying respectively in the same vertical planes as the corresponding rails on the other level; a plurality of carriages, each said carriage having two wheels mounted on the transverse center axis of said carriage and having complementary connecting means mounted on its opposite ends, said carriage being mounted by its wheels on the rails with connecting means of each carriage in complementary engagement with the adjoining carriages next ahead and behind, said connecting means being adapted to engage and disengage when their respective carriages are moved at respectively different speeds, each said carriage being held untilted relative to said rails by the end engagements of said connecting means, and each said carriage having pairs of vertically spaced pins mounted on its sides, said pins extending horizontally outward and mounted two pairs to a side, the pairs of each side being equally and oppositely spaced longitudinally from the transverse center axis of the carriage; carriage drive means for moving said carriages on said rails at a constant linear speed; two pairs of equal and oppositely disposed arms mounted, respectively on the respective sides and at one end of said parallel rails and midway between said pairs of rails, for rotation about an axis transverse said rails and parallel to the axes of said carriage wheels, said oppositely disposed arms on each side of said rails being similarly oriented angularly, and extending between said pairs of rails when in the vertical position; guide means, pivotally mounted on the respective ends of said arms and extending therebeyond, for slidably engaging each pair of said vertically spaced pins of the carriage nearest the end of the rails; guide control means mounted eccentric to, and to rotate with, each pair of oppositely disposed arms and operably connected to said guide means for maintaining them always vertical as said arms are rotated, said guide control means including locking means actuated by said eccentric rotation for locking and releasing said vertically spaced pins slidably engaged in said guide means; and means for rotating said pairs of arms and said guide means at a greater constant peripheral speed than said constant linear speed of said carriages, whereby when said connected carriages are moved by said carriage drive means in connected line toward said one end of a pair of said rails, said guide means, rotated with said arms, are adapted to slidably engage said vertically spaced pins on the sides of the carriage moving toward and nearest said one end of the rails when the horizontal component of its peripheral speed equals the linear speed of the carriage in the same direction and to accelerate the carriage to said peripheral speed thereby disengaging its connecting means and detaching it from the following carriage while supporting the accelerated carriage horizontally, the continued rotation of said arms carrying the carriage from one said level to the other and depositing it on the rails at said other level, the carriage moving along the rails at peripheral speed to engage its connecting means with the connecting means of the preceding carriage moving at said carriage drive linear speed, said pairs of vertically spaced pins disengaging from said guide means when the horizontal component of the peripheral speed falls below the carriage drive linear speed.

2. Improved apparatus for the conveyance of objects as described in claim 1 wherein each said guide means comprises a supporting member defining two longitudinal channels horizontally spaced apart symmetrical with respect to said transverse center axis, said member being pivoted along its transverse center axis to an end portion of an arm and with its longitudinal axis parallel to the plane of said arm, said channels being adapted to engage said pairs of vertically spaced pins horizontally mounted on a carriage side associated therewith.

3. Improved apparatus for the conveyance of objects as described in claim 1 wherein said guide control means comprises a first lever, having oppositely disposed ends, fixed by one of said oppositely disposed ends to each of said guide means, a second lever eccentrically mounted with respect to the axis of rotation of said oppositely disposed arms and fixed to rotate with said arms, a free end of said second lever being pivotally connected to the other of said oppositely disposed ends of said first lever, said first levers being driven as cranks by said second lever to rotate said guide means as said arm is rotated to keep said longitudinal axis vertical.

4. An improved apparatus for the conveyance of objects as described in claim 3 wherein said guide control means includes locking means comprising, a cam plate defining an annular cam profile, fixed to rotate with the ends of said oppositely disposed arms, a cam follower mounted to rotate with said guide means and adapted to follow the cam profile of the cam plate, locking pins mounted for horizontal movement in said guide means normal to said transverse center axis and linkage means connecting said cam follower to said locking pins for actuating said pins to locking and releasing said vertically spaced carriage pins engaged in said guide means.

5. An improved apparatus for the conveyance of objects as described in claim 1 wherein said guide control means comprises a bevel gear fastened to said guide means and rotatable with the pivot thereof, a rotatable shaft projecting from the arm carrying said guide means, said shaft being provided with bevel gears at the ends thereof, one said bevel gear engaging the bevel gear of said guide means, a bevel gear mounted on a fixed part and coaxial with the center of rotation of said arm engaging the bevel gear on other end of said shaft, whereby when said shaft rotates with said arm around the center of rotation of said arm said fixed bevel gear rotates the beveled gear on said other end of the shaft, and said shaft around its longitudinal axis, thereby driving through said bevel gears at said one end of said shaft said guide means around its pivot to maintain the longitudinal axis of said guide means vertical.

6. An improved apparatus for the conveyance of objects as described in claim 5 wherein said guide control means includes locking means comprising, a cam plate defining an annular cam profile, fixed to rotate with the ends of said oppositely disposed arms, a cam follower mounted to rotate with said guide means and adapted to follow the cam profile of the cam plate, locking pins mounted for horizontal movement in said guide means normal to said transverse center axis and linkage means connecting said cam follower to said locking pins for actuating said pins to locking and releasing said vertically spaced carriage pins engaged in said guide means.

References Cited in the file of this patent

UNITED STATES PATENTS

| | | |
|---|---|---|
| 1,875,535 | Whitney | Sept. 6, 1932 |
| 1,883,964 | Kramer | Oct. 25, 1932 |
| 2,771,175 | Da Costa | Nov. 20, 1956 |

FOREIGN PATENTS

| | | |
|---|---|---|
| 208,173 | Australia | Oct. 20, 1955 |